United States Patent [19]

Inoue et al.

[11] Patent Number: 4,900,134

[45] Date of Patent: Feb. 13, 1990

[54] OPTICAL DEVICE

[75] Inventors: Hiroaki Inoue; Toshio Katsuyama, both of Hachioji; Hiroyoshi Matsumura, Saitama; Shinji Sakano, Hachioji; Hitoshi Nakamura, Kanagawa, all of Japan

[73] Assignee: Hitachi, Ltd., Tokyo, Japan

[21] Appl. No.: 138,874

[22] Filed: Dec. 29, 1987

[30] Foreign Application Priority Data

Jan. 19, 1987 [JP] Japan .................................. 62-8028

[51] Int. Cl.⁴ .............................................. G02F 1/17
[52] U.S. Cl. .................................. 350/354; 350/96.13
[58] Field of Search ................ 350/354, 96.13; 357/4, 357/29, 30

[56] References Cited

U.S. PATENT DOCUMENTS

| | | | |
|---|---|---|---|
| 4,382,660 | 5/1983 | Pratt, Jr. et al. | 350/353 |
| 4,573,767 | 3/1986 | Jewell | 350/354 |
| 4,626,075 | 12/1986 | Chemla | 350/354 |
| 4,693,547 | 9/1987 | Soref et al. | 350/354 X |
| 4,701,030 | 10/1987 | Jewell | 350/354 |

FOREIGN PATENT DOCUMENTS 0058455 5/1979 Japan .................................. 350/354

Primary Examiner—Eugene R. LaRoche
Assistant Examiner—Nathan W. McCutcheon
Attorney, Agent, or Firm—Antonelli, Terry & Wands

[57] ABSTRACT

An optical device having a material exhibits an optical rectification effect is disclosed. The optical device utilizes direct current polarization which is induced in the material by a control light. The induction of the direct current polarization in the material by the control light changes the refractive index and absorption spectrum of the material. This is based on the so-called electrooptic effect and Franz-Keldysh effect. The present invention provides the optical device according to which external incident light can be modulated at high speed with the control light by utilizing the change of the refractive index or the change of the absorption spectrum.

28 Claims, 5 Drawing Sheets

OPTICAL DEVICE

BACKGROUND OF THE INVENTION:

1. Field of the Invention

The present invention relates to a device having the function of modulating the amplitude, phase or frequency of light waves or switching optical paths.

More particularly, it relates to optical devices in which the modulations are effected with light (control light) thereby to permit high-speed operations. Such improved optical devices include, for example, devices called an optical modulator, an optical switch, an optical bistable device, an optical logic device and an optical memory device. In particular, the present invention concerns optical devices well suited for applications to optical communications and optical information processing systems of which the information processing abilities of high speed and large capacity are required.

2. Description of the Related Art

As an optical device for modulating light, there has heretofore been known, for example, one described in Applied Physics Letters, vol. 45 (1), 1, July, 1984, p. 13 to p. 15 (Miller et al.). As shown in FIG. 1, it is so constructed that incident light 17 is caused to enter a device which is formed of a triple-layer stacked structure of p (11)-, i (13)- and n (12)-types having a multiple quantum well (MQW) 14 made of GaAs/GaAlAs, and that the incident light 17 is modulated under an electric field applied by an external electric signal source 16, thereby to obtain output light 18. With the prior art, the device is electrically driven. This poses the problem that the modulation speed of the device is limited by the product of a load resistance 15 and the capacitance between electrodes (not shown), namely, by a CR time constant. It has been difficult to employ such a device for high-speed modulation.

SUMMARY OF THE INVENTION:

An object of the present invention is to solve the problem of the prior art, and to provide a device capable of modulating an input signal at high speed.

Another object of the present invention is to improve a modulation limit which is determined by a CR time constant.

Still another object of the present invention is to employ a modulating signal which is different from an electric signal applied by an external electric signal supply source.

In order to accomplish the aforementioned and other objects, the present invention discloses an optical device which is made of a material presenting an optical rectification effect.

More specifically, in the present invention, control light is caused to enter the material which exhibits the optical rectification effect, for example, a group-III–V compound semiconductor, and a direct current polarization (D.C.P.) induced in the material by the control light is utilized. More specifically, it is a feature of the present invention to utilize the change of the refractive index or absorption spectrum of the material based on an electro-optic effect or the Franz-Keldysh effect caused by the D.C.P.

The present invention requires application of the controlling (or modulating) light as stated above, and accordingly requires a control-light incidence surface. This, however, does not always necessitate a special structure for the present invention. The same holds true of an incidence surface and an output surface respectively corresponding to incident light and output light to be described in each embodiment of the present invention. By way of example, these surfaces may be constructed as openings or will possibly be constructed as unreflecting coating surfaces alternatively. In an extreme case, not quite such a structure will exist.

Figure 1:
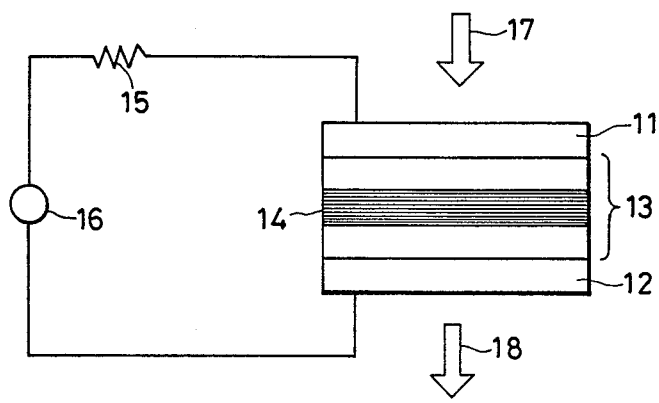
FIG. 1 is a view for explaining a prior art.

DETAILED DESCRIPTION OF THE PREFERRED EMBODIMENTS:

The optical rectification effect is a phenomenon in which the D.C.P. is induced within the crystal of, for example, a group-III–V compound semiconductor by light. This is a quadratic nonlinear optical phenomenon. By way of example, when light waves having an angular frequency of $\omega$ enter the crystal which exhibits the electrooptic effect, the polarization P based on the electric field of the light is induced by the quadratic nonlinear optical phenomenon, in the following form:

$$P \alpha \sin^2 \tfrac{\omega}{2} t = \tfrac{1}{2}(1 - \cos 2\omega t) \quad (1)$$

The first term in parentheses on the right-hand side of Equation (1) is he D.C.P. component which expresses the optical rectification effect. This D.C.P. is positively utilized by the present invention. (The second term denotes polarization which contributes to the second-order higher harmonics component oscillating at an angular frequency of $2\omega$.)

The magnitude of the D.C.P. is proportional to the square of the intensity of the incident light. Besides, the response rate of the formation of this polarization is usually in the order of picoseconds, and the response is very high.

Silicon (Si), group-III–V compound semiconductors such as GaAs and InP, ternary-system materials such as InGaAs and InAlAs, quaternary-system materials such as InGaAsP, group-II–VI compound semiconductors such as ZnTe, ZnS, ZnSe, CdTe, CdS and CdSe, and dielectric materials such as LiNbO$_3$, KDP, ADP and ATP, give rise to the electro-optic effect and the Franz-Keldysh effect owing to electric fields generated in them. These phenomena appear as the changes of the refractive indices of the materials and the changes of the absorption spectra thereof. The present invention is characterized in that the phenomena are caused by light applied externally therefrom. In more detail, the aforementioned effects are caused by utilizing the electric fields based on the D.C.P. generated within the materials by the externally applied light, thereby to realize optical devices such as a total reflection type optical switch and an optical modulator utilizing the index changes.

Since the optical devices according to the present invention employ the light as the modulation means thereof, they can modulate and switch input signals at high speed without being limited by a CR time constant.

Further, using a material which has a multiple quantum well (MQW) structure, the physical phenomena stated above bring forth very great changes in the physical quantities in synergy with an MQW.

By the way, the wavelength of the incident light should desirably be close to the excitonic absorption wavelength of the material which exhibits the optical rectification effect (namely, a wavelength near the absorption end of the material) in order to make the modulation more effective. The control light may have a wavelength longer than the excitonic absorption wavelength lest it should be absorbed in the material. Besides, as the wavelength of the control light is longer, the intensity thereof needs to be higher for attaining a fixed modulation effect.

In cases where the materials presenting the optical rectification effect for use in the present invention are applied to the devices, the thicknesses of the films thereof may be as desired. In general, the thicknesses will be several mm or less.

The dimensions of each device are determined according to the use and purpose thereof. However, in a case where the material forms the MQW layer, the thickness of each of the layers constituting the invention will be described in detail with reference to the drawings.

Figure 2:
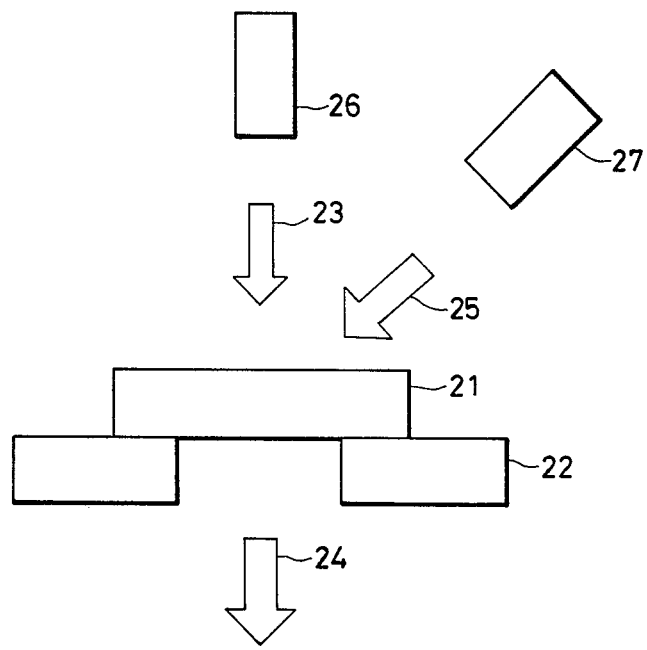
FIG. 2 is a view for explaining an embodiment of the present invention.

Embodiment 1:

As illustrated in FIG. 2, a square chip 21 of 5 mm × 5 mm having a thickness of 0.1 mm was cut out of a GaAs single crystal, and it was bonded to a supporter 22 to construct an optical device. Incident light 23 from a light source 26 having a wavelength of 1.3 μm, and control light 25 from a light source 27 having a wavelength of 1.06 μm and flickering at a recurrence frequency of 50 MHz were caused to enter the surface of the optical device. Then, the incident light 23 was modulated by the control light 25 and was emitted from the opposite surface as output light 24 with its phase modulated at 50 MHz.

Figure 3:
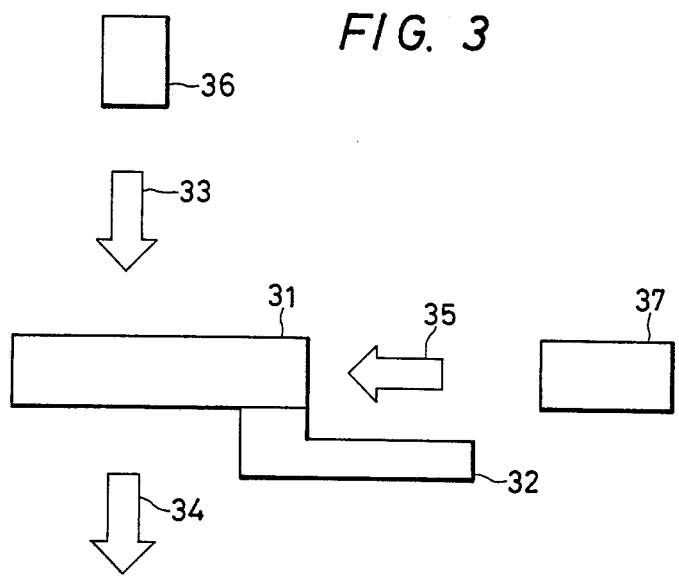
FIG. 3 is a view for explaining another embodiment of the present invention.
Figure 4:
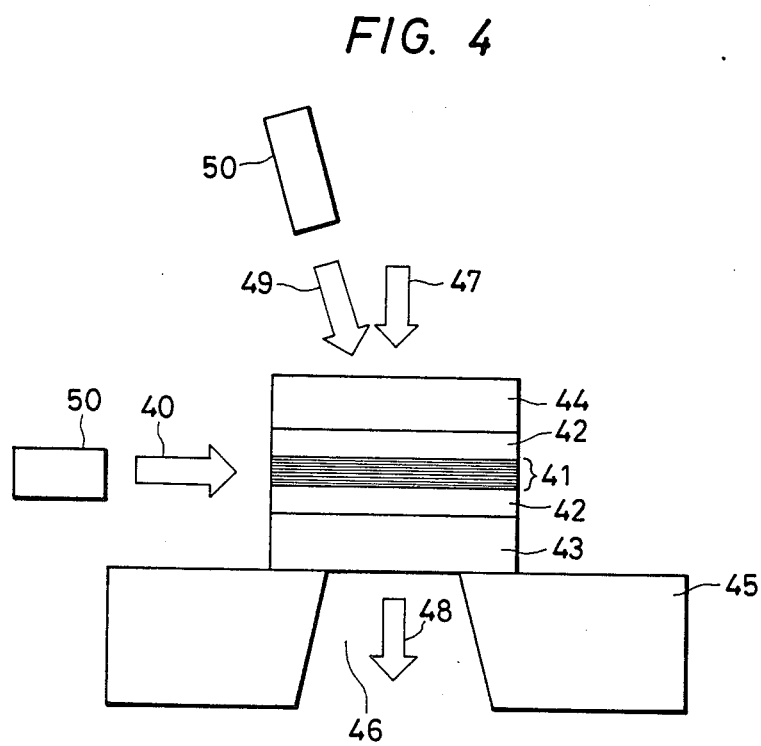
FIG. 4 is a view for explaining still another embodiment of the present invention.

Embodiment 2:

As illustrated in FIG. 3, by the same method as in Embodiment 1, a rectangular chip 31 of 5 mm × 6 mm having a thickness of 0.15 mm was cut out of an InP crystal, and it was bonded to a supporter 32 to construct an optical device. Signal light 33 from a light source 36 was caused to enter one surface of the optical device, and control light 35 from a light source 37 was caused to enter another surface. Then, the incident light 33 modulated by the control light 35 was emitted as output light 34 from a surface opposite to the incidence surface Embodiment 3:

Reference will be had to FIG. 4.

An $n^+$—$Ga_{0.6}Al_{0.4}As$ layer 43, an undoped $Ga_{0.6}Al_{0.4}As$ layer 42, an undoped $GaAs/Ga_{0.6}Al_{0.4}As$ MQW layer 41, another undoped $Ga_{0.6}Al_{0.4}As$ layer 42 and a $p^+$—$Ga_{0.6}Al_{0.4}As$ layer 44 were successively crystal-grown on an $n^+$—GaAs substrate 45 by the use of MOCVD (metal-organic chemical vapor deposition). Subsequently, the grown layers 41, 42, 43 and 44 were removed leaving square parts of 2 mm × 2 mm behind by the use of dry etching. In addition, a circular window 46 having a diameter of 1 mm was provided in the part of the substrate just under the square layer parts by the use of selective etching, thereby permitting incident light waves 47 to pass as output light waves 48.

The MQW layer 41 was prepared as consisting of 50 pairs of layers each of which was 100Å thick. In general, each layer should desirably have a thickness of at most 200Å.

Each of the other layers may be about 0.5 to 1 μm thick.

Figure 5A:
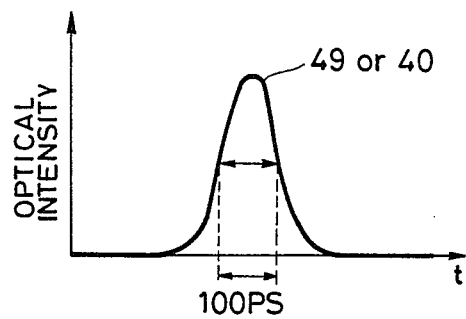
FIG. 5A is a diagram for explaining the operation of an embodiment according to the present invention, and shows the change of the intensity of control light versus time.
Figure 5B:
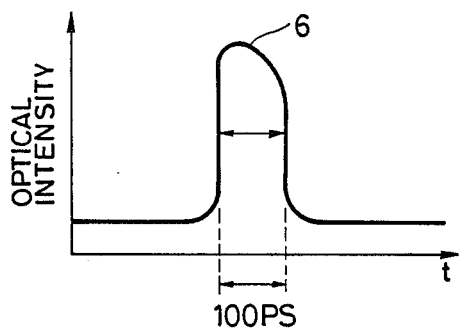
FIGS. 5B and 5C are diagrams for explaining the operations of embodiments according to the present invention, and show the changes of the intensities of modulated output lights versus time.
Figure 5C:
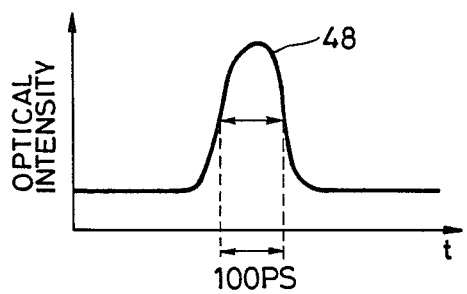

A semiconductor laser beam at a wavelength of 0.852 μm corresponding to the peak wavelength of the absorption of the MQW layer 41 was caused to enter the fabricated device as the incident light waves 47. Further, light from a mode-synchronous YAG laser 50 having a wavelength of 1.06 μm, a pulse width of 100 psec and a recurrence frequency of 82 MHz (the light was in a waveform shown in FIG. 5A, and had a peak power of 1 MW) was used as control light waves 49, and was caused to enter in superposition on the incident light waves 47. Then, the output light waves 48 at the wavelength of 0.852 μm were modulated as shown in FIG. 5C. This was based on the fact that an electric field was generated within the crystals by D.C. polarization which the mode-synchronous YAG laser beam induced, and that the absorption end wavelength was shifted by the Franz-Keldysh effect. The waveforms in FIGS. 5A and 5B were obtained in such a way that the control light waves 49 and the output light waves 48 were respectively observed with a streak camera having a time resolution of 10 ps. Here, a conspicuous response delay was not observed, and the feature of high speed in the present invention could be acknowledged.

Figure 9:
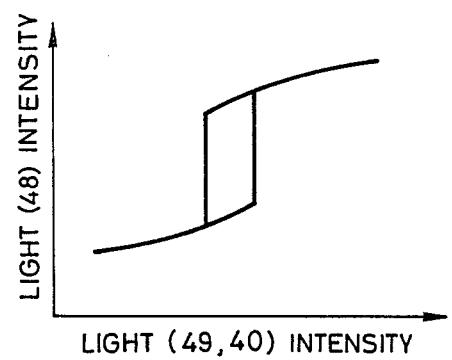
FIG. 9 is a diagram for explaining the operation of an embodiment of the present invention.

Further, an optical bistability shown in FIG. 9 is realized in the relationship of the present embodiment between the optical intensity (FIG. 5A) of the control light 49 or 40 and the optical intensity (FIG. 5C) of the output light 48. This is based on the fact that, since the excitonic absorption peak of the MQW is abrupt, the absorption characteristic is changed suddenly with a nonlinearity by the electric field of the induced D.C. polarization. In other words, it could be verified that the present invention is also applicable to an optical bistable device for optical logic operations and an optical memory device.

Similar effects could be acknowledged even when the control light (49) was caused to enter laterally as shown in FIG. 3, not from above the optical device as shown in FIG. 2.

It is considered that the two outer surfaces of the semiconductor layers 43 and 44 serve as mirrors, whereupon a kind of cavity is formed. Then, obviously both the surfaces may well be formed with further layers for changing the reflection coefficients thereof in the present embodiment.

Embodiment 4:

This embodiment will be described with reference to FIGS. 8A and 8B.

Figure 8A:
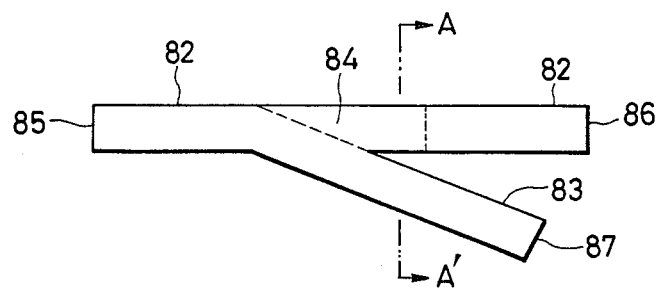
FIGS. 8A and 8B are views for explaining an optical switch which is an embodiment of the present invention.
Figure 8B:
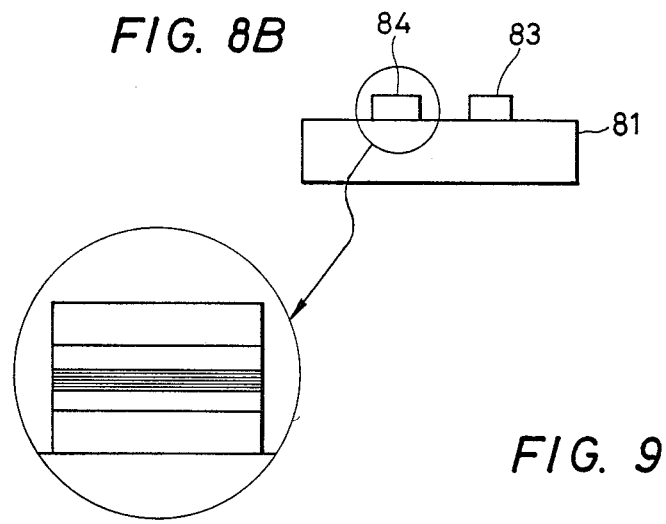

First, as shown in FIG. 8A, optical waveguides 82 and 83 made of n-GaAs layers were formed on an $n^+$—GaAs substrate 81 by the well-known epitaxial growth. Next, a region 84 of the optical rectification effect, which was part of the optical waveguide 82, was removed by dry etching. Subsequently, the same semiconductor layers as shown in Embodiment 3 were formed. Thus, an optical device was finished up. FIG. 8B is a sectional view taken along A-A' in FIG. 8A.

Signal light (not shown) at a wavelength of 1.3 μm was caused to enter the entrance end 85 of the optical device, and control light (not shown) at a wavelength of 0.85 μm was projected on the region 84. Then, output light having been emitted from the exit end 86 of the device without the projection of the control light was emitted from the exit end 87 thereof, and optical switching was verified.

Incidentally, the above embodiments of the present invention could be performed even when the crystal materials were replaced with Si and InGaAsP.

Figure 6:
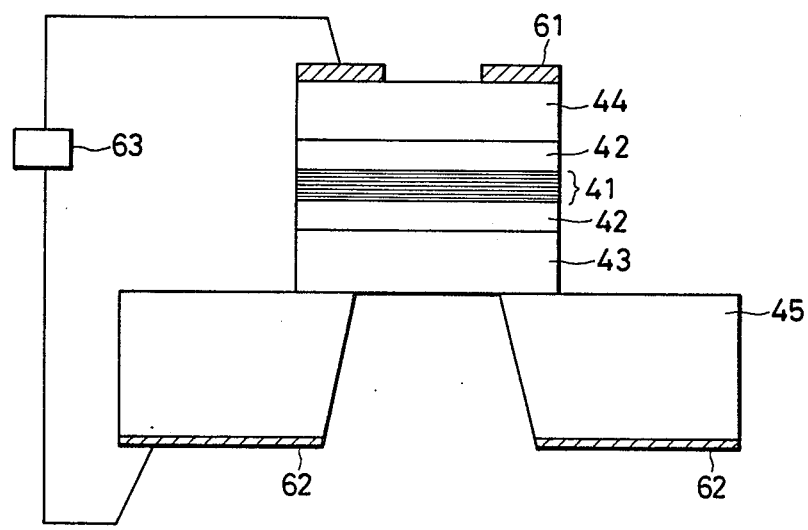
FIGS. 6 and 7 are views showing further embodiments of the present invention.

Embodiment 5:

As shown in FIG. 6, the present embodiment was such that the construction of Embodiment 3 (FIG. 4) was additionally provided with a p-side electrode 61 and an n-side electrode 62 which had light transmitting openings, respectively. A voltage of 10 V was applied across both the electrodes by a power source 63 so as to afford a p-n reverse bias. Then, effects similar to those of Embodiment 3 were obtained. Of course, the electrodes 61 and 62 may well be transparent electrodes. In this case, the opening of the electrode 61 is not necessary.

Figure 7:
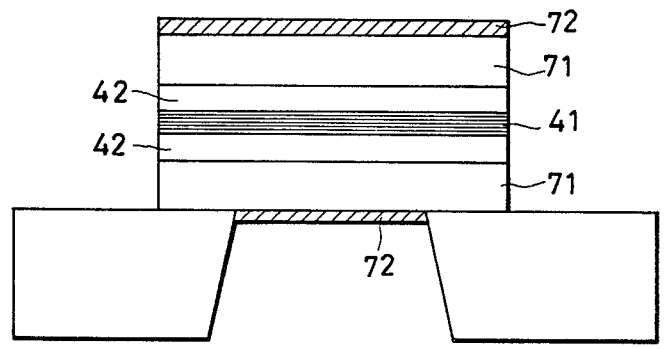

Embodiment 6:

The present embodiment had a construction which was similar to that of Embodiment 3 (FIG. 4), but in which the p+—GaAlAs layer 44 and the n+— GaAlAs layer 43 were respectively replaced with undoped GaAlAs layers 71, and the upper and lower surfaces of the sample were respectively formed with dielectric multilayer films 72 as reflective coatings. The details of the construction are illustrated in FIG. 7. When the same incident light and control light as in Embodiment 3 were caused to enter the fabricated device, an optical bistability characteristic shown in FIG. 5B was realized. This was based on the fact that an electric field was generated within the crystals by D.C. polarization induced in the MQW, and that the refractive index in the MQW for the incident light waves changed through the Franz-Keldysh effect. That is, it could be verified that an optical bistable device of high speed is realizable also with the present embodiment.

When, in all the embodiments of the present invention thus far described, the polarization direction of the control light was changed, remarkable polarization-dependencies were observed. In particular, when the polarization direction of the control light waves was substantially 45° with respect to a crystal axis, the greatest effects were attained, and when it was parallel to the crystal axis, the least effects were attained. Thus, it could be verified that the effects of the present invention are based on the quadratic nonlinear optical effect.

The materials used in the embodiments are not restrictive, but all the materials mentioned before are available for the present invention.

What is claimed is:

1. An optical device comprising:
supporting means; and
modulation means, supported by said supporting means, having an optical rectification material which is polarized by a control light, wherein said optical rectification material has an excitonic absorption wavelength which is smaller than the wavelength of said control light.

2. An optical device as claimed in claim 1, wherein said optical rectification material has its refractive index and absorption spectrum changed by said control light.

3. An optical device as claimed in claim 1, wherein said supporting means is a semiconductor substrate.

4. An optical device as claimed in claim 1, wherein said modulation means is made of at least one of materials selected from the group consisting of Si, GaAs, InP, InGaAs, InAlAs, InGaAsP, ZnTe, ZnS, ZnSe, CdTe, CdS and CdSe.

5. An optical device comprising:
a semiconductor substrate;
semiconductor layers formed on said semiconductor substrate, having an optical rectification layer which is polarized by a control light, wherein said optical rectification layer has an excitonic absorption wavelength which is smaller than the wavelength of said control light;
a first surface of said semiconductor layers which accepts said control light;
a second surface of said semiconductor layers which accepts incident light that is modulated at said optical rectification layer by said control light; and
a third surface of said semiconductor layers which delivers output light that is the modulated incident light.

6. An optical device as claimed in claim 5, wherein said optical rectification layer has a multiple quantum well structure.

7. An optical device as claimed in claim 5, wherein said semiconductor layers are made of group-III-V compound semiconductor materials.

8. An optical device as claimed in claim 5, wherein said optical device has a pair of electrodes.

9. An optical device as claimed in claim 6, wherein said semiconductor layers have reflecting coatings.

10. An optical device as claimed in claim 8, wherein said electrodes are transparent.

11. An optical device comprising:
a semiconductor substrate;
an optical waveguide formed onm said semiconductor substrate and having selectively actuated optical waveguide paths and a crossing part for said paths; and
an optical rectification layer formed at said crossing part so as to switch light traversing along one of said optical waveguide paths into another optical waveguide path of said optical waveguide in response to a control light, wherein said optical rectification layer has an excitonic absorption wavelength which is smaller than the wavelength of said control light.

12. An optical device according to claim 11, wherein said optical rectification layer has at least its refractive index changed by said control light.

13. An optical device according to claim 12, wherein said optical rectification layer is made of group - III-V compound semiconductor materials.

14. An optical device according to claim 13, wherein said optical rectification layer has a multiple quantum well structure.

15. An optical device according to claim 14, wherein said multiple quantum well structure is comprised of a plurality of vertically stacked layers each of about 100Å thick.

16. An optical device according to claim 14, wherein said multiple quantum well structure is comprised of a plurality of vertically stacked layers, each one having a thickness of at least 100Å but not greater than 200Å.

17. An optical device according to claim 14, wherein said multiple quantum well structure is an undoped structure which consists of vertically stacked layers sandwiched between a pair of undoped layers which are in turn respectively stacked with a highly-doped arsenide outer layer, one such outer layer being a highly-doped p+ layer and the other outer layer being a highly-doped n+ layer.

18. An optical device according to claim 17, wherein said multiple quantum well structure is comprised of a plurality of vertically stacked layers each of about 100Å thick.

19. An optical device according to claim 17, wherein said multiple quantum well structure is comprised of a plurality of vertically stacked layers, each one having a thickness of at least 100Å but not greater than 200 Å.

20. An optical device according to claim 1, wherein said optical rectification material has its refractive index changed by said control light.

21. An optical device according to claim 1, wherein said optical rectification material has its absorption spectrum changed by said control light.

22. An optical device according to claim 6, wherein said multiple quantum well structure is comprised of a plurality of vertically stacked layers each of about 100Å thick.

23. An optical device according to claim 6, wherein said multiple quantum well structure is comprised of a plurality of vertically stacked layers, each one having a thickness of at least 100Å but not greater than 200Å.

24. An optical device according to claim 6, wherein said multiple quantum well structure is an undoped structure which consists of vertically stacked layers sandwiched between a pair of undoped layers which are in turn respectively stacked with a highly-doped arsenide outer layer, one such outer layer being a highly-doped p+ layer and the other outer layer being a highly-doped n+ layer.

25. An optical device according to claim 24, wherein said multiple quantum well structure is comprised of a plurality of vertically stacked layers each of about 100Å thick.

26. An optical device according to claim 24, wherein said multiple quantum well structure is comprised of a plurality of vertically stacked layers, each one having a thickness of at least 100Å but not greater than 200Å.

27. An optical device according to claim 26, wherein each of the outer layers has a thickness substantially between 0.5 $\mu$m to 1 $\mu$m.

28. An optical device according to claim 25, wherein each of the outer layers has a thickness substantially between 0.5 $\mu$m to 1 $\mu$m.

* * * * *